(12) United States Patent
Ito

(10) Patent No.: US 11,305,318 B2
(45) Date of Patent: Apr. 19, 2022

(54) PARTICLE SORTING APPARATUS AND PARTICLE SORTING METHOD

(71) Applicant: SONY GROUP CORPORATION, Tokyo (JP)

(72) Inventor: Tatsumi Ito, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 17/240,390

(22) Filed: Apr. 26, 2021

(65) Prior Publication Data
US 2021/0245202 A1    Aug. 12, 2021

Related U.S. Application Data

(63) Continuation of application No. 16/543,074, filed on Aug. 16, 2019, now Pat. No. 11,072,002, which is a
(Continued)

(30) Foreign Application Priority Data

Apr. 4, 2013   (JP) .............................. JP2013-078212

(51) Int. Cl.
   *B07C 5/342*   (2006.01)
   *F16K 99/00*   (2006.01)
   *B07C 5/34*    (2006.01)

(52) U.S. Cl.
   CPC .......... *B07C 5/342* (2013.01); *B07C 5/3416* (2013.01); *F16K 99/0001* (2013.01); *F16K 99/0028* (2013.01); *B07C 5/34* (2013.01)

(58) Field of Classification Search
   CPC .......... B07C 5/34; B07C 5/342; B07C 5/3416; F16K 99/0001; F16K 99/0028
   See application file for complete search history.

(56) References Cited

U.S. PATENT DOCUMENTS

| 8,358,412 | B2 | 1/2013 | Kanda |
| 8,487,273 | B2 | 7/2013 | Ito et al. |

(Continued)

FOREIGN PATENT DOCUMENTS

| CN | 101382499 A | 3/2009 |
| CN | 102564925 A | 7/2012 |

(Continued)

OTHER PUBLICATIONS

State Intellectual Propert Office of the People's Republic of China, Office Action for CN Patent Application No. 2014101237620 (related to above-captioned patent application), dated Apr. 12, 2017.
(Continued)

*Primary Examiner* — Michael McCullough
*Assistant Examiner* — Kalyanavenkateshware Kumar
(74) *Attorney, Agent, or Firm* — K&L Gates LLP

(57) ABSTRACT

A particle sorting apparatus is provided. The particle sorting apparatus includes a first detector of a first scatter channel to detect a first light scatter generated by a particle flowing in a flow channel of a fluid sample and passing through a first laser beam, and a second detector of a second scatter channel to detect a second light scatter generated by the particle flowing in the flow channel of the fluid sample and passing through a second laser beam. The particle sorting apparatus also includes circuitry configured to output a first scatter pulse information and a first detection time of the first light scatter channel, a second scatter pulse information and a second detection time of the second light scatter channel. The first laser beam and the second laser beam are irradiated to the particle in different positions of the flow channel.

22 Claims, 8 Drawing Sheets

Related U.S. Application Data continuation of application No. 15/811,056, filed on Nov. 13, 2017, now Pat. No. 10,486,198, which is a continuation of application No. 14/223,549, filed on Mar. 24, 2014, now Pat. No. 9,855,587.

(56) References Cited

U.S. PATENT DOCUMENTS

| | | |
|---|---|---|
| 2009/0057569 A1 | 3/2009 | Shinoda |
| 2012/0078531 A1 | 3/2012 | Lo et al. |
| 2013/0050698 A1 | 2/2013 | Muraki et al. |

FOREIGN PATENT DOCUMENTS

| | | |
|---|---|---|
| JP | 2003-286940 | 10/2003 |
| JP | 2009-063305 | 3/2009 |
| JP | 2009-109218 | 5/2009 |
| JP | 2009-145213 | 7/2009 |
| JP | 2009-162650 | 7/2009 |
| JP | 2010-038866 | 2/2010 |
| JP | 2010-525325 A | 7/2010 |
| JP | 2011-521228 A | 7/2011 |
| JP | 2012-127922 | 7/2012 |
| WO | WO 2009/008236 A | 1/2009 |
| WO | 2009/078307 A1 | 6/2009 |

OTHER PUBLICATIONS

Japanese Office Action dated Aug. 28, 2018 in corresponding Japanese Application No. 2017-150212.

Office Action issued in related Japanese Patent Application No. 2019-071878 dated May 26, 2020 and English translation of same. 9 pages.

Japanese Office Action dated Mar. 3, 2020 in corresponding Japanese Application No. 2019-071878 and English translation of same. 11 pages.

T. Kumagai, et al., "Study on the Determination of the Charge Delay Time of Cell Sorter", Department of Electrical and Electronic Engineering, Toyohashi University of Technology, Sep. 29, 1993, p. 215-p. 216.

Office Action issued in related Chinese Patent Application No. 201711431785.8 dated Jul. 3, 2019 and English translation of same. 19 pages.

| Event No. | Trigger Ch | Trigger Time | | CH1 Detection Time | | CH2 Detection Time | |
|---|---|---|---|---|---|---|---|
| Sorting Time | | Gate Flag | Sort Flag | | | | |
| Ch1 Area | | | | | | | |
| Ch2 Area | | | | | | | |
| Ch3 Area | | | | | | | |
| Ch4 Area | | | | | | | |
| Ch1 Height | | | | | | | |
| Ch2 Height | | | | | | | |
| Ch3 Height | | | | | | | |
| Ch4 Height | | | | | | | |
| Ch1 Width | | | | | | | |
| Ch2 Width | | | | | | | |
| Ch3 Width | | | | | | | |
| Ch4 Width | | | | | | | |

Acquisition event
of former particle

Non-acquisition event
of former particle

——— Signal derived from particles to be sorted
- - - - Signal derived from particles to be not sorted

PARTICLE SORTING APPARATUS AND PARTICLE SORTING METHOD

CROSS REFERENCES TO RELATED APPLICATIONS

The present application is a continuation of U.S. application Ser. No. 16/543,074, filed Aug. 16, 2019, which is a continuation of U.S. application Ser. No. 15/811,056, filed Nov. 13, 2017, which is a continuation of U.S. application Ser. No. 14/223,549, filed Mar. 24, 2014, which claims priority to Japanese Priority Patent Application JP 2013-078212, filed in the Japan Patent Office on Apr. 4, 2013, the entire content of which is hereby incorporated by reference.

BACKGROUND

The present disclosure relates to a particle sorting apparatus and a particle sorting method. More particularly, the present disclosure relates to a technology for sorting and recovering particles based on a result of an optical analysis.

In the related art, to analyze biologically-relevant particles such as cells, microorganisms and liposomes, an optical measuring method using a flow cytometry (flow cytometer) is utilized. The flow cytometer is an analyzer for irradiating particles flowing through a flow path formed within a flow cell or a microchip with light and detecting fluorescence or a scattered light emitted from each particles.

One of the flow cytometers has a function to sort and recover the particles having a specific property based on a result of analysis. In particular, an apparatus for sorting cells is called as "a cell sorter". As a sorting method used in the cell sorter, a liquid droplet charging method of charging and separating liquid droplets containing particles is mainly used (for example, see Japanese Patent Application Laid-open No. 2009-145213). In an apparatus using the liquid droplet charging method, a fluid discharged from a flow cell or a microchip is liquefied, and liquid droplets are positively (+) or negatively (−) charged, changed their traveling directions by a deflection plate and recovered by a predetermined container.

However, the sorting method such as the liquid droplet charging method where the liquid droplets are formed is undesirably affected by a change in a measurement environment or a liquid pressure change. A particle sorting apparatus where particles are sorted within a microchip has then been proposed in the related art (see Japanese Patent Application Laid-open No. 2012-127922). The particle sorting apparatus described in Japanese Patent Application Laid-open No. 2012-127922 sucks particles to be recovered into a negative pressure suction unit within the microchip. Therefore, forming liquid droplets and charging are unnecessary, whereby stable sorting can be done at a high speed without damaging the particles.

The particle sorting apparatus in the related art is generally controlled to acquire the particles to be recovered after a predetermined time from detection at a light detecting unit. The time to acquire the particles from detection is set in advance based on a liquid pressure, a distance from a detection position to a sorting position, etc. However, by the controlling method where an arrival time is fixed in this way, a purity of recovered particles or an acquisition rate is undesirably lowered, once a flow speed of the particles is changed.

On the other hand, the apparatus described in Japanese Patent Application Laid-open No. 2009-145213 detects a migration speed of each particle and controls a timing to charge each particle based on the migrating speed in order to prevent the purity from lowering due to the change in the flow speed of the particles. In the liquid droplet charging method, it may only determine that the respective particles belong to which liquid droplets. However, in the apparatus for sorting within the microchip, fluid mechanism characteristics may be considered as well as attributes of adjacent particles. Here, the "attributes of particles" mean that the particles are to be sorted or not, and the "fluid mechanism characteristics" mean a counter flow generated when a pulse signal is risen for acquisition operation.

In the liquid droplet charging method, the liquid droplets are controlled. However, in the method for sorting within the microchip described in Japanese Patent Application Laid-open No. 2012-127922, the respective particles should be controlled. In addition, there are differences in a path to arrive at an acquisition position and a factor affecting the arrival of the particles between the liquid droplet charging method and the method for sorting within the microchip. For the above reasons, the technology described in Japanese Patent Application Laid-open No. 2009-145213 is not simply applied to the apparatus for sorting within the microchip described in Japanese Patent Application Laid-open No. 2012-127922.

It is desirable to provide a particle sorting apparatus and a particle sorting method for effectively sorting particles within microchip.

SUMMARY

According to an embodiment of the present disclosure, there is provided a particle sorting apparatus, including:
an excited light irradiating unit for irradiating an excited light to particles flowing through a flow path;
a light irradiating unit for detecting a speed for irradiating a light for detecting a speed to the particles at a position different from the excited light;
a light detecting unit for detecting a light emitted from the particles;
a calculating unit of an arrival time for individually calculating an arrival time of each particle at a sorting unit being communicating with the flow path from a detection time difference between the light derived from the excited light and the light derived from the light for detecting a speed; and
a sorting control unit for controlling sorting of the particles;
the flow path and the sorting unit being disposed within a microchip, and
the sorting control unit determining whether or not the particles are recovered based on data of each particle detected at the light detecting unit and the arrival time calculated at the calculating unit of an arrival time.

The sorting control unit calculates an arrival time difference of former and latter particles, and determines that the particles are not recovered when the arrival time difference is under a threshold value.

The light for detecting a speed may have a wavelength different from a wavelength of the exited light.

In this case, the calculating unit of the arrival time can calculate the arrival time of each particle from the detection time difference between a scattered light derived from the excited light and a scattered light derived from the light for detecting a speed.

In addition, the excited light irradiating unit may include two or more light sources emitting lights having different wavelengths.

The sorting unit may have a negative pressure suction unit being communicated with the flow path.

In this case, the sorting control unit controls an operation of the negative pressure suction unit based on the data of the respective particles detected at the light detecting unit and the arrival time calculated at the calculating unit of an arrival time.

Also, the sorting control unit can control a timing to recover the particles by the sorting unit based on the data of the respective particles detected at the light detecting unit and the arrival time calculated at the calculating unit of an arrival time.

According to an embodiment of the present disclosure, there is provided a method of sorting particles, including:
  irradiating an excited light to particles flowing through a flow path disposed within a microchip;
  irradiating a light for detecting a speed to the particles at a position different from the excited light;
  detecting a light emitted from the particles;
  individually calculating an arrival time of each particle at a sorting unit disposed within the microchip and being communicating with the flow path from a detection time difference between the light derived from the excited light and the light derived from the light for detecting a speed; and
  sort-controlling to determine whether or not the particles are recovered based on data of each particle detected by the light detection and the arrival time calculated by the arrival time calculation.

The sorting control may include calculating an arrival time difference of former and latter particles, and determining that the particles are not recovered when the arrival time difference is under a threshold value.

The light for detecting a speed having a wavelength different from a wavelength of the exited light can be used.

In this case, the calculation of the arrival time may include calculating the arrival time of each particle from the detection time difference between a scattered light derived from the excited light and a scattered light derived from the light for detecting a speed.

The irradiation of an excited light can emit different wavelengths from two or more light sources.

Also, the sorting unit may have a negative pressure suction unit being communicated with the flow path. In this case, the sorting control includes controlling an operation of the negative pressure suction unit based on the data of the respective particles detected by the light detection and the arrival time calculated by the arrival time calculation.

In addition, the sorting control can include controlling a timing to recover the particles by the sorting unit based on the data of the respective particles detected by the light detection and the arrival time calculated by the arrival time calculation.

According to the present disclosure, the sorting control unit determines whether or not the particles are recovered based on data of each particle detected at the light detecting unit and the arrival time calculated at the calculating unit of an arrival time. Thus, acquisition properties can be improved.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, an embodiment of the present disclosure will be described with reference to the drawings.

The embodiments of the present disclosure will be described in the following order.
1. First Embodiment (Example of Particle Sorting Apparatus including Sorting Control Unit)
2. Alternative Embodiment of First Embodiment (Example of Particle Sorting Apparatus including Mode Switching Function)

1. First Embodiment

Figure 1:
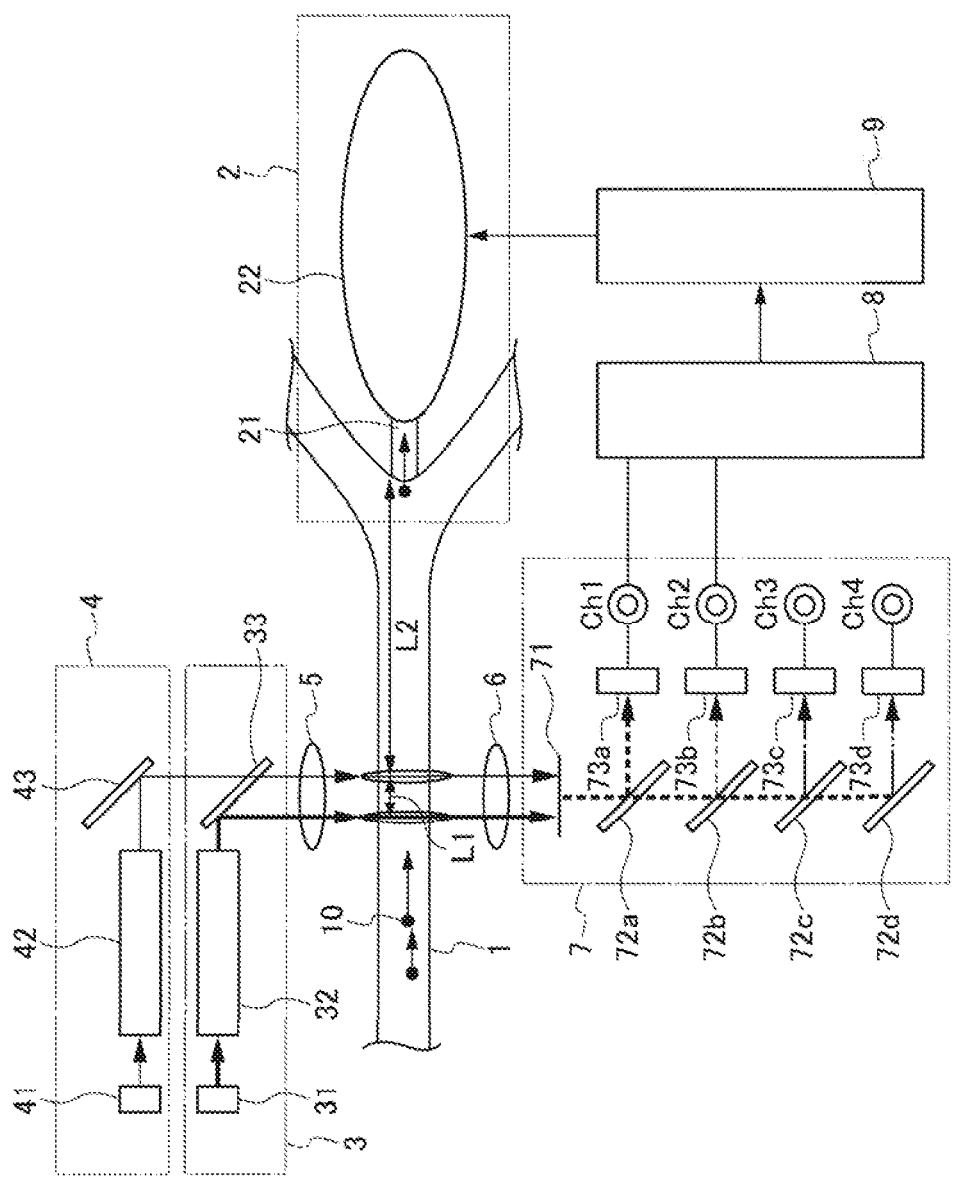
FIG. 1 is a diagram for schematically showing a configuration of a particle sorting apparatus according to a first embodiment of the present disclosure.
Figure 2:
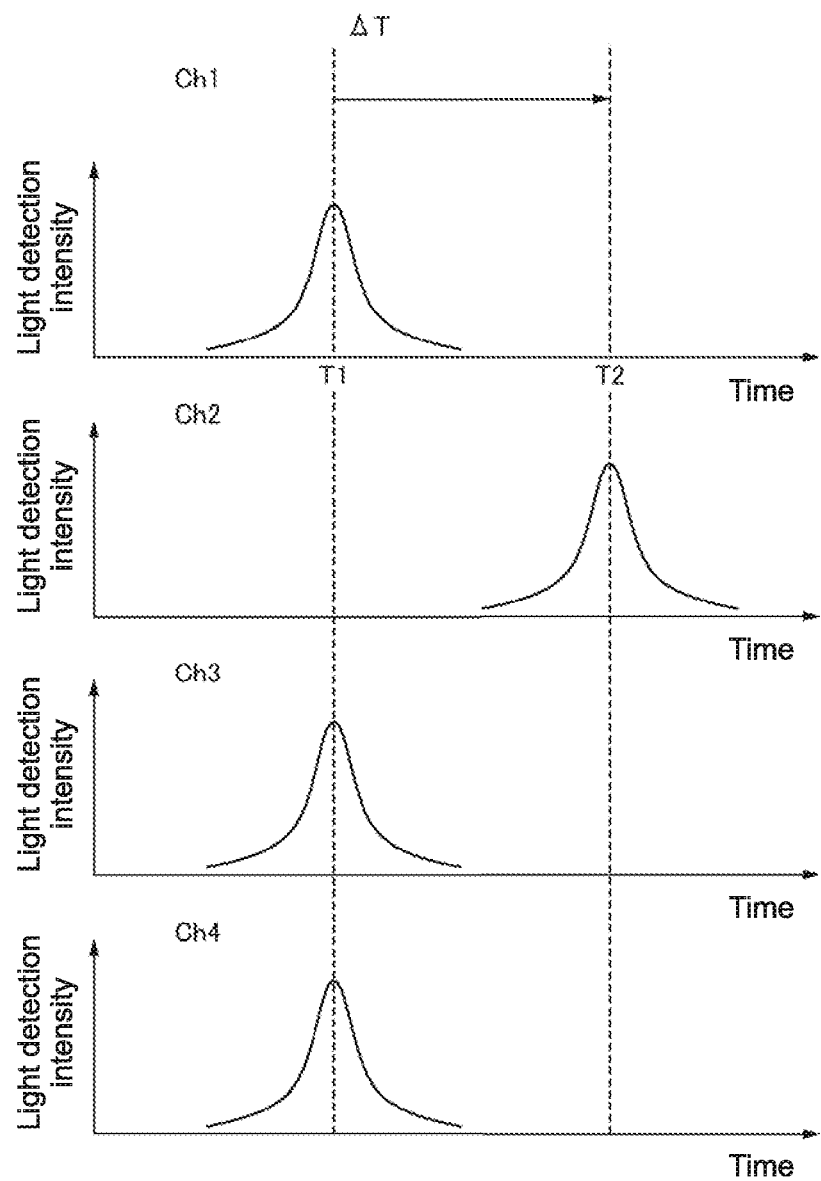
FIG. 2 shows graphs of detection data at a light detecting unit 7 shown in FIG. 1.

Firstly, a particle sorting apparatus 1 according to a first embodiment of the present disclosure will be explained. FIG. 1 is a diagram for schematically showing a configuration of the particle sorting apparatus 1 according to the first embodiment of the present disclosure. FIG. 2 shows graphs of detection data at a light detecting unit 7.

[Overall Configuration of Apparatus]

As shown in FIG. 1, the particle sorting apparatus 1 according to the first embodiment sorts and recovers particles 10 based on a result of an optical analysis. The particle sorting apparatus 1 includes a flow path 1, a sorting unit 2, an excited light irradiating unit 3, a light irradiating unit for detecting a speed 4, a light detecting unit 7, a calculating unit of an arrival time 8 and a sorting control unit 9, for example.

[About Particles 10]

Examples of the particles 10 analyzed and sorted by the particle sorting apparatus 1 according to the first embodiment include biologically-related particles such as cells, microorganisms and ribosomes; and synthesized particles such as latex particles, gel particles and industrial particles.

Examples of the biologically-related particles include chromosome, ribosome, mitochondoria and organella (cell organelle) that are constituents of a variety of cells. Examples of the cells include plant cells, animal cells and blood cells. Examples of the microorganisms include bacteria such as Bacillus coli, viruses such as a tabacco mosaic virus, and fungi such as Yeast. Also, the biologically-related particles can involve biologically-related polymers such as nucleic acids, proteins and composites thereof.

The industrial particles include organic polymer materials, inorganic polymer materials or metal materials, for example. As the organic polymer materials, polystyrene, styrene-divinyl benzene, polymethyl methacrylate and the like can be used. As the inorganic materials, glass, silica, magnetic materials and the like can be used. As the metal materials, gold colloid, aluminum and the like can be used. In general, shapes of the particles are spherical, but may be non-spherical. Seizes and masses of the particles are not especially limited.

[Flow Path 1]

The flow path 1 is formed within the microchip, into which a liquid (a sample liquid) containing the particles 10 to be sorted is fed. The microchip including the flow path 1 can be formed of glass or a variety of plastics (PP, PC, COP, PDSM or the like). Desirably, the material of the microchip transmits the light irradiated from the excited light irradiating unit 3 and the light irradiating unit for detecting a speed 4, emits less autofluorescence, has small wavelength dispersion, and induces less optical errors.

The flow path 1 can be shaped by wet-etching or dry-etching a glass substrate, nanoimprinting, injection molding or machining a plastic substrate. The microchip can be formed by sealing the substrate in which the flow path 1 is shaped with a substrate made of the same material or a different material.

FIG. 1 shows only an area where the flow path 1 is irradiated with the excited light or the light for detecting a speed. At an upstream side thereof, a flow path for feeding the sample liquid containing the particles 10 and a pair of flow paths for feeding a sheath liquid may be provided. In this case, the flow paths for feeding a sheath liquid meet at both sides of the flow path for feeding the sample liquid. At a downstream side of a meeting point, the flow path 1 is provided. Within the flow path 1, the sheath flow surrounds the sample flow, the liquid flows in a state that a laminar flow is formed, and the particles 10 in the sample liquid flow in an almost row to the flow direction.

[Sorting Unit 2]

The sorting unit 2 sorts the particles 10 to be sorted, and is formed within the microchip. The sorting unit 2 is communicated with the flow path 1 at a downstream side, and is configured of a suction flow path 21 and a negative pressure suction unit 22. The configuration of the negative pressure suction unit 22 is not especially limited as long as microparticles to be sorted can be sucked at a predetermined timing. For example, the negative pressure suction unit 22 may have the configuration that a volume of the negative pressure suction unit 22 can be expanded by an actuator (not shown) at any timing.

[Excited Light Irradiating Unit 3]

The excited light irradiating unit 3 includes a light source 31 for generating an excited light such as a laser light, an optical system 32 for shaping a spot shape and a mirror 33. The excited light irradiating unit 3 irradiates the particles 10 flowing through the flow path 1 formed within the microchip with the excited light. In FIG. 1, one light source 31 is shown. However, the present disclosure is not limited thereto, and two or more light sources 31 may be provided. In such a case, the respective light sources 31 may emit lights having different wavelengths.

[Light Irradiating Unit for Detecting Speed 4]

The light irradiating unit for detecting a speed 4 includes a light source 41 for generating a light for detecting a speed, an optical system 42 for shaping a spot shape and a mirror 43. The light irradiating unit for detecting a speed 4 irradiates the particles 10 flowing through the flow path 1 formed within the microchip with the light for detecting a speed at a position different from the above-mentioned excited light.

The light for detecting a speed may have the same wavelength as the exited light. From the standpoint of simplification of the apparatus configuration, the light for detecting a speed desirably has the wavelength different from the wavelength of the exited light.

[Light Detecting Unit 7]

The light detecting unit 7 detects a light (a scattered light, fluorescence) generated from the particles 10 flowing through the flow path 1, and includes a zero-order light removing member 71, mirrors 72a to 72d, light detecting units 73a to 73d. As the light detecting units 73a to 73d, PMT (Photo Multiplier Tube) or an area imaging sensor such as a CCD or a CMOS element can be used.

In the light detecting unit 7, the light detecting unit 73a detects a forward-scattered light derived from the excited light, the light detecting unit 73b detects a scattered light derived from the light for detecting a speed, and the light detecting units 73c, 73d detect fluorescence. The light to be detected in the light detecting unit 7 is not limited thereto, and a side scattered light, a Rayleigh scattered light, or a Mie scattered light may be detected. The light detected at the light detecting unit 7 is converted into an electrical signal.

[Calculating Unit of Arrival Time 8]

The calculating unit of an arrival time 8 individually calculates an arrival time of each particle 10 at the sorting unit 2 being communicated with the flow path from a detection time difference between the light derived from the excited light and the light derived from the light for detecting a speed. A method of calculating the arrival time is not especially limited. For example, the arrival time of each particle 10 is calculated from the detection time difference between the forward-scattered light (data of Ch1) derived from the excited light detected at the light detecting unit 7 and the forward-scattered light (data of Ch2) derived from the light for detecting a speed, as shown in FIG. 2.

Here, the arrival time to the sorting unit 2 can be calculated by a simple linear approximate expression represented by the following numerical expression 1. In the numerical expression 1, L1 denotes a distance from a position for irradiating the excited light to a position for irradiating the light for detecting a speed, and L2 denotes a distance from the position for irradiating the light for detecting a speed to the suction flow path 21 of the sorting unit 2 (see FIG. 1). In the numerical expression 1, T1 denotes the detection time of the light derived from the excited light, T2 denotes the detection time of the light derived from the light for detecting a speed, and (T1−T2) denotes a difference between these detection times (see FIG. 2).

$$(\text{Arrival time}) = (L2/L1) \times (T1-T2) \qquad \text{[Numerical Expression 1]}$$

A method of calculating the arrival time to the sorting unit 2 is not limited to the linear approximate expression represented by the numerical expression 1. Other calculation method such as a polynomial approximate expression and a look-up table may be used.

[Sorting Control Unit 9]

The sorting control unit 9 controls sorting of the particles 10, and determines whether or not the particles 10 are recovered based on the data of the respective particles 10 detected at the light detecting unit 7 and the arrival time calculated at the calculating unit of an arrival time 8. The sorting control unit 9 calculates an arrival time difference of "former" and "latter" particles 10, and determines that the particles having the calculated arrival time difference under a threshold value preliminary set will "not be recovered". Thus, when the particles 10 flow closely each other, the former particles or the latter particles to be recovered are prevented from being entrained and acquired wrongly.

In addition, the sorting control unit 9 controls a timing to recover the particles 10 by the sorting unit 2, for example, by controlling an operation of the negative pressure suction unit 22, based on the above-described determination result. In this way, an acquisition accuracy of the particles to be intended can be improved to sort the particles with higher purity or at higher acquisition rate.

[Operation]

Next, an operation of the particle sorting apparatus of this embodiment will be described. When the particles are sorted by the particle sorting apparatus of this embodiment, the sample liquid containing the particles to be sorted is fed into a sample inlet disposed within the microchip, and the sheath liquid is fed into a sheath inlet disposed within the microchip. Then, the particles 10 flowing through the flow path 1 are irradiated with the excited light and the light for detecting a speed at a position different from that of the exited light. In this case, as shown in FIG. 1, the excited light and the light for detecting a speed may be collected by one light collecting lens 5 to irradiate the particles 10, but may be collected by different light collecting lenses.

Next, the light detecting unit 7 detects the light emitted from each particle 10, and the calculating unit of the arrival time 8 individually calculates the arrival time of each particle 10 at the sorting unit 2 from the detection time difference between the light derived from the excited light and the light derived from the light for detecting a speed. In this case, as shown in FIG. 1, the light derived from the excited light and the light derived from the light for detecting a speed may be collected by one light collecting lens 6 to the zero-order light removing member 71, but may be collected by different light collecting lenses.

Thereafter, the sorting control unit 9 determines whether or not the particles 10 are recovered based on the data of the respective particles 10 detected at the light detecting unit 7 and the arrival time calculated at the calculating unit of an arrival time 8. Based on the determination result, the sorting control unit 9 controls the timing to recover the particles 10 by the sorting unit 2. For example, when the sorting unit 2 includes the negative pressure suction unit 22 being communicated with the flow path 1, the sorting control unit 9 controls the operation of the actuator disposed at the negative pressure suction unit 22.

As described in detail, the particle sorting apparatus of this embodiment calculates the arrival time of each particle to the sorting unit, and determines whether or not the particles are recovered in view not only of the optical characteristic data of each particle but of the arrival time to the sorting unit. In this way, irrespective of a flowing position or a flowing status of each particle, the particles can be sorted with higher purity or at higher acquisition rate. As a result, acquisition properties can be improved as compared to the particle sorting apparatus in the related art.

As the particle sorting apparatus of this embodiment calculates the arrival time of each particle, a flow rate is less affected by a change in an environment temperature or a residual quantity in a supply tank. Thus, a highly precise control of the flow rate is unnecessary so that an inexpensive pressure control device can be used and a parts control of the flow path and an assembly accuracy control can be simplified. As a result, the manufacturing costs can be decreased.

2. Alternative Embodiment of First Embodiment

Next, a particle sorting apparatus according to an alternative embodiment of the first embodiment of the present disclosure will be explained. In the particle sorting apparatus according to the alternative embodiment, when the determination whether or not the particles are recovered is done, a user can select either that the "purity" has priority or that the "acquisition rate" has priority.

Figure 3:
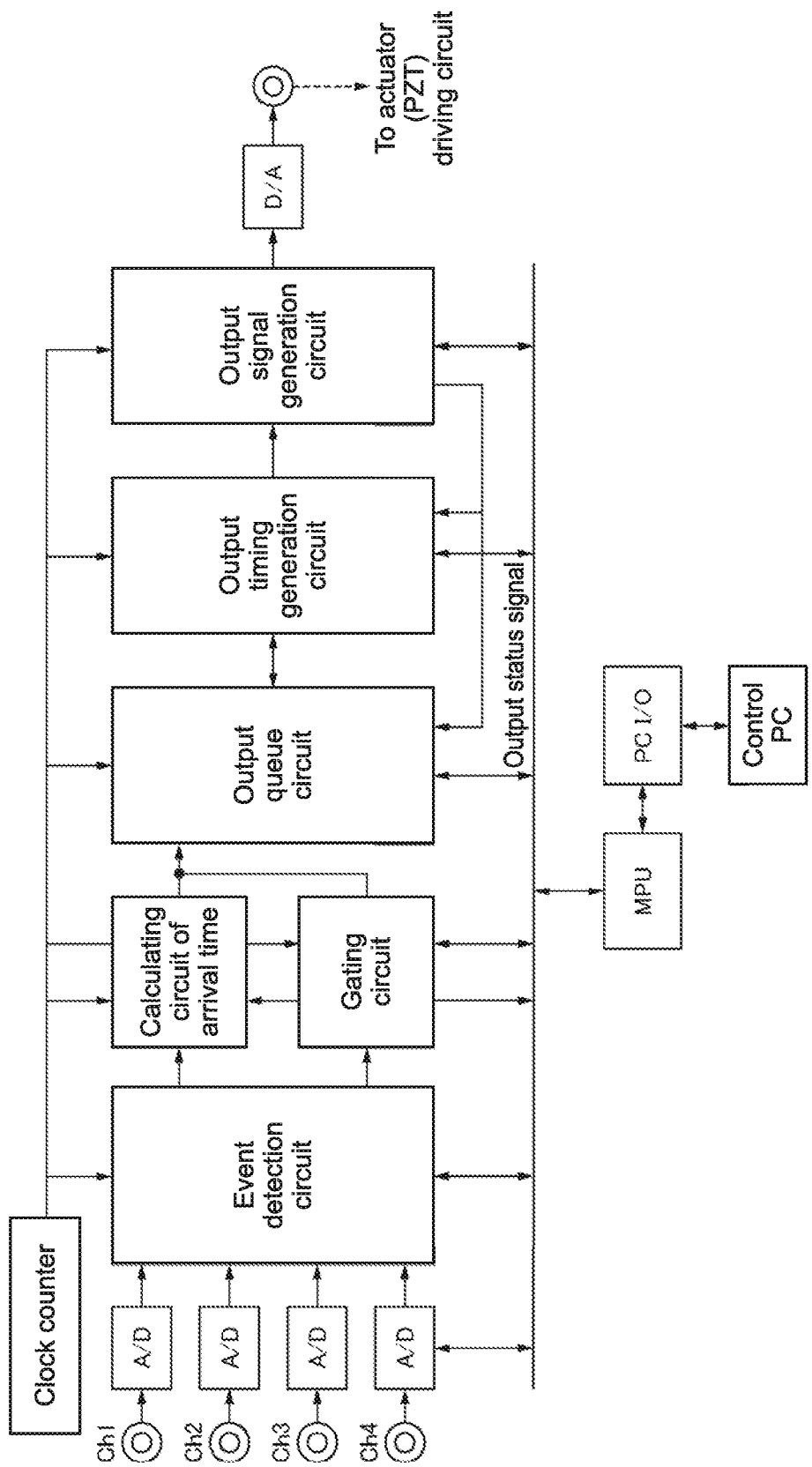
FIG. 3 is a block diagram showing a circuit configuration in a calculating unit of an arrival time 8 and a sorting control unit 9 of a particle sorting apparatus according to an alternative embodiment of the first embodiment of the present disclosure.
Figures 4A, 4B:
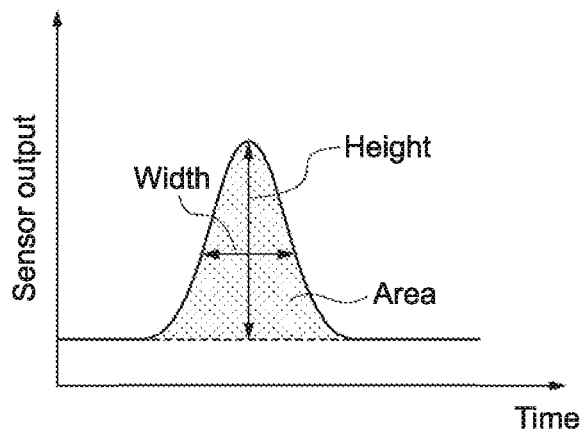
FIGS. 4A and 4B each shows a processing at an event detection circuit shown in FIG. 3.
Figure 5A:
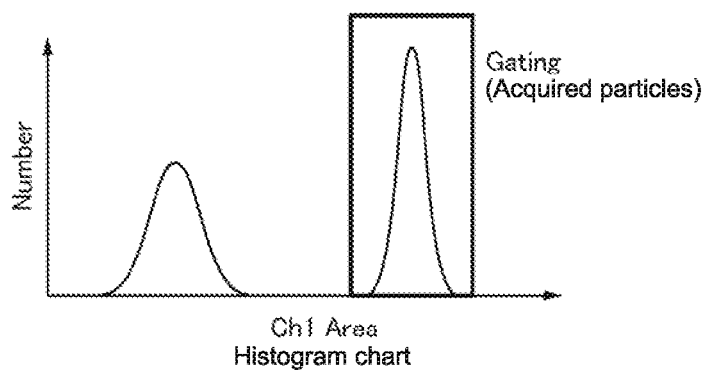
FIGS. 5A and 5B each shows a distance at a gating circuit shown in FIG. 3.
Figure 5B:
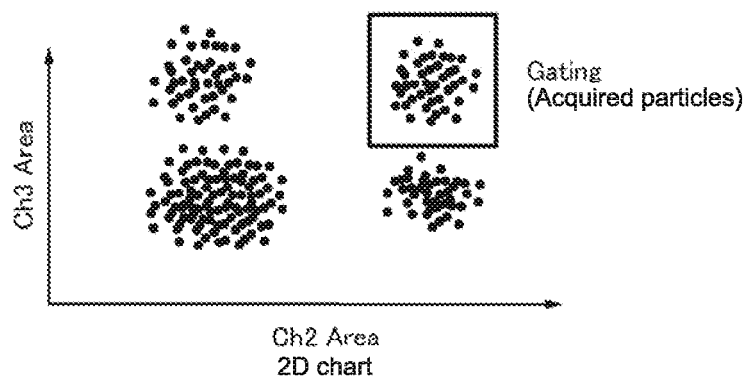

FIG. 3 is a block diagram showing a circuit configuration in the calculating unit of an arrival time 8 and the sorting control unit 9 of the particle sorting apparatus according to the alternative embodiment. FIGS. 4A and 4B are diagrams showing a processing at an event detection circuit. FIGS. 5A and 5B are diagrams showing a distance at a gating circuit. Sorting at a "purity priority mode" or an "acquisition rate priority mode" can be attained by the circuit configuration shown in FIG. 3, for example.

[Event Detection Circuit]

An event detection circuit reads a waveform of each Ch by applying a trigger with detection signals of Ch1 and Ch2 to calculate a width, a height and an area shown in FIG. 4A. As to detection data Ch1 concerning the forward-scattered light derived from the excited light and detection data Ch2 concerning the forward-scattered light derived from the light for detecting a speed, a time at a waveform center is calculated as the detection time.

Then, as shown in FIG. 4B, the event detection circuit correlates each particle 10 with the detection signals of Ch1 (the forward-scattered light derived from the excited light) and Ch2 (the forward-scattered light derived from the light for detecting a speed) acquired in time series, and packetizes the detection data (events) of the respective particles. A packet includes items that are updated as the subsequent processing is proceeded. Flag is basically 1/0, which corresponds to acquisition/non-acquisition determined by each logic. As the detection times, trigger times of Ch1 and Ch2 can be used.

[Calculating Circuit of Arrival Time]

A calculating circuit of an arrival time calculates the arrival time using the detection times (T1, T2) of the Ch1 and Ch2 from the above-described numerical expression 1, which will be a "sorting time" of an event packet.

[Gating Circuit]

A gating circuit determines "acquisition/non-acquisition" of the particles 10 based on the threshold value preliminary set, and sets "Gate Flag" of an event packet. For example, before starting a gating acquisition operation, GUI on a computer for controlling is used to plot a histogram chart shown in FIG. 5A or a 2D chart shown in FIG. 5B. A group of acquired particles (a particle group having intended properties) is geometrically bundled and is designated.

A parameter (threshold value) for determining the "acquisition/non-acquisition" may be any of the width, the height and the area of the detection data acquired in each Ch and a combination thereof.

[Output Queue Circuit]

An output queue circuit rearranges the detection data (the event) of each particle 10 in an arrival order to the sorting unit based on the arrival time to the sorting unit ("Sorting Time"). Thereafter, the "acquisition/non-acquisition" is determined depending on a sorting mode selected by the user such as the "purity priority mode" and the "acquisition rate priority mode". Based on the result, "Sort Flag" is set.

Figure 6:
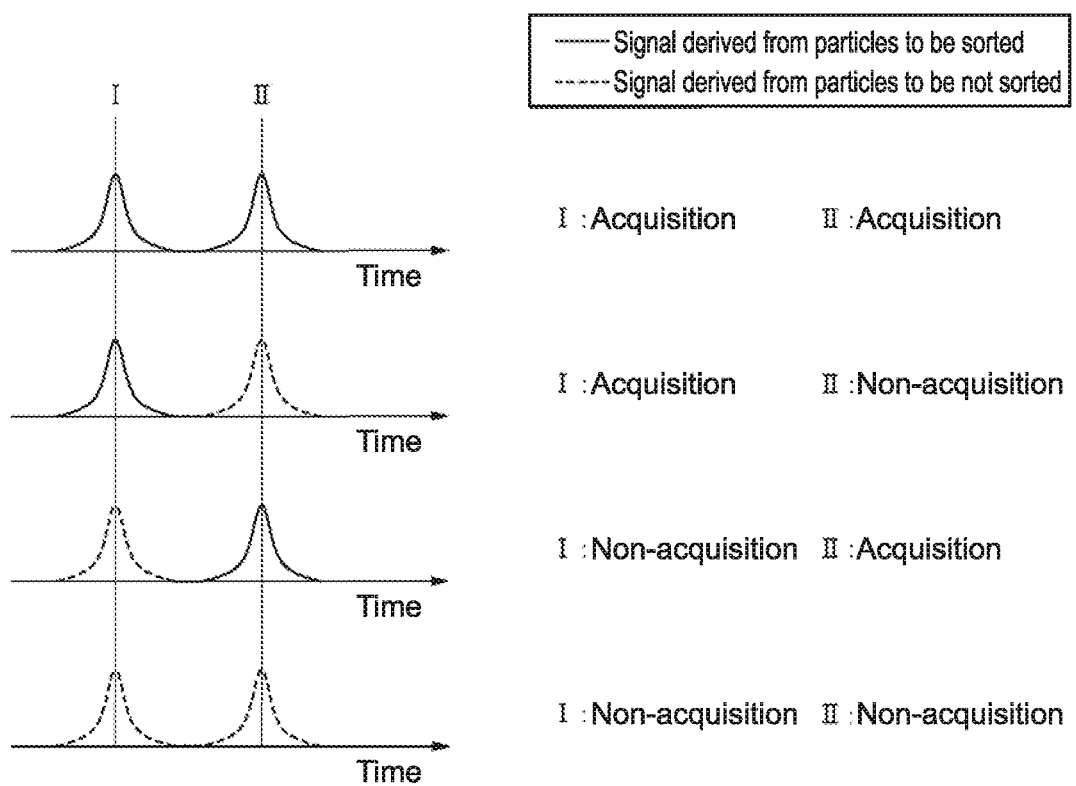
FIG. 6 shows an operation in an acquisition rate priority mode.
Figure 7A:
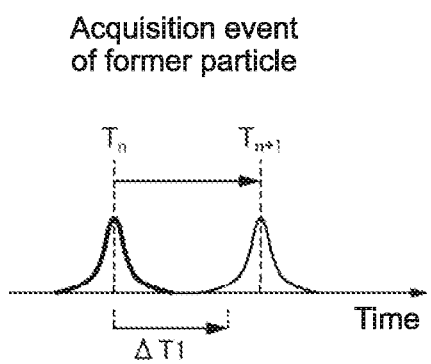
FIGS. 7A and 7B show detection data when the particles are adjacent.
Figure 7B:
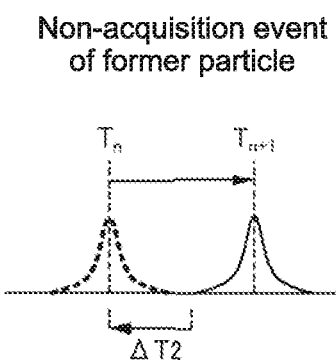
Figure 8:
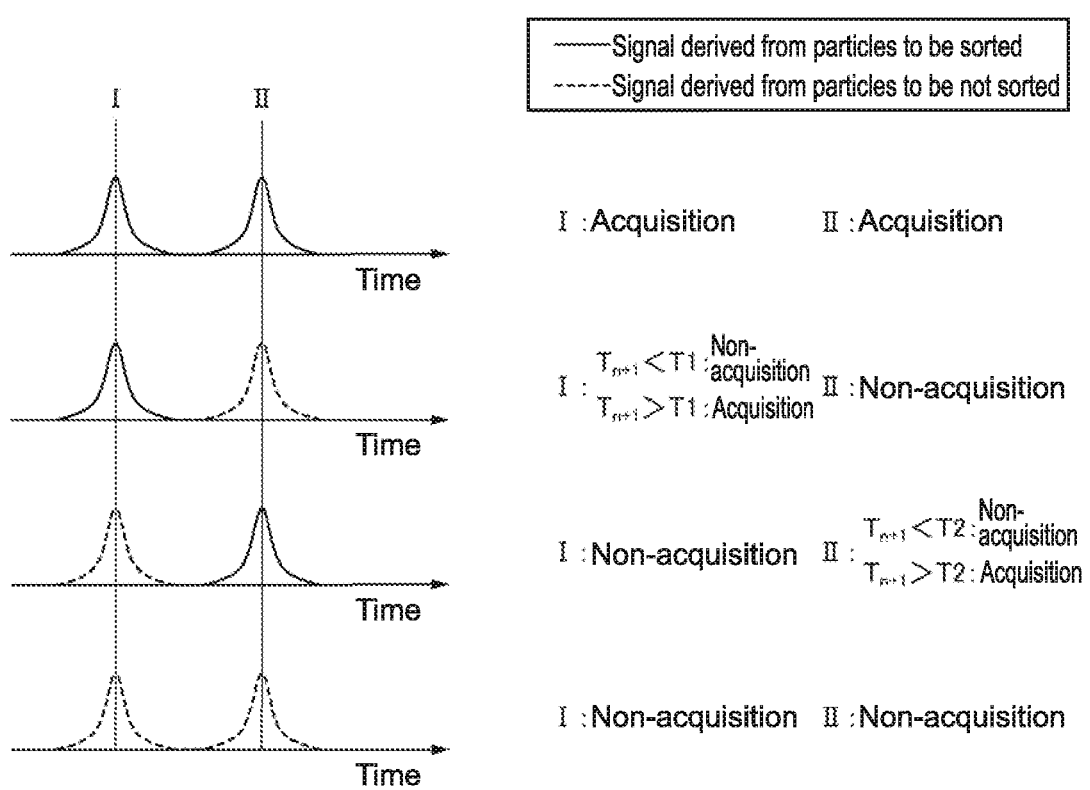
FIG. 8 shows an operation in a purity priority mode.

When the particles 10 flow closely each other, the former particles or the latter particles may be entrained by one acquisition operation, and a plurality of particles 10 may be recovered twice at the sorting unit 2. A method of determining the "acquisition/non-acquisition" is different in the case of the "purity priority mode" or the "acquisition rate priority mode", when the particles 10 are adjacent. FIG. 6 shows an operation in the "acquisition rate priority mode". FIGS. 7A and 7B show detection data when the particles are adjacent. FIG. 8 shows an operation in the purity priority mode.

In the "acquisition rate priority mode", the number of acquisition particles is increased even if the purity of the particles captured is decreased. As shown in FIG. 6, when the particles 10 flow closely each other, the particles to be sorted are recovered. In contrast, in the "purity priority mode", the purity of the particles captured is increased. When the acquisition particles and the non-acquisition particles are adjacent, the acquisition particles are daringly regarded as the "non-acquisition particles" in order to prevent the acquisition particles from capturing together with the non-acquisition particles.

In particular, in the "purity priority mode", as shown in FIG. 8, when the detection data (the event) of the particles 10 detected later is adjacent to that of the former particles 10, determination of the "acquisition/non-acquisition" in the former event will be again necessary. Here, ΔT1 shown in FIG. 7A is a set value and a time to entrain the latter particle (T1=Tn+ΔT1). Also, ΔT2 is a set value and a time to entrain the former particle (T2=Tn+ΔT2).

[Output Timing Generation Circuit]

An output timing generation circuit reads out an event time (Sorting time) acquired foremost at the output queue, compares it to a Clock Counter value and generates an output timing signal at the time.

[Output Signal Generation Circuit]

An output signal generation circuit detects the output timing signal, and outputs a waveform signal for controlling the actuation device at the sorting unit 2.

According to the particle sorting apparatus of the alternative embodiment, when the determination whether or not the particles are recovered is done, the user can select either that the "purity" has priority or that the "acquisition rate" has priority. As a result, sorting can be made depending on its purpose. The configurations and the advantages of the alternative embodiment other than the above are similar to those of the above-described first embodiment.

The present disclosure may have the following configurations.

(1) A particle sorting apparatus, including:
an excited light irradiating unit for irradiating an excited light to particles flowing through a flow path;
a light irradiating unit for detecting a speed for irradiating a light for detecting a speed to the particles at a position different from the excited light;
a light detecting unit for detecting a light emitted from the particles;
a calculating unit of an arrival time for individually calculating an arrival time of each particle at a sorting unit being communicating with the flow path from a detection time difference between the light derived from the excited light and the light derived from the light for detecting a speed; and
a sorting control unit for controlling sorting of the particles;
the flow path and the sorting unit being disposed within a microchip, and
the sorting control unit determining whether or not the particles are recovered based on data of each particle detected at the light detecting unit and the arrival time calculated at the calculating unit of an arrival time.

(2) The particle sorting apparatus according to (1) above, in which
the sorting control unit calculates an arrival time difference of former and latter particles, and determines that the particles are not recovered when the arrival time difference is under a threshold value.

(3) The particle sorting apparatus according to (1) or (2) above, in which
the light for detecting a speed has a wavelength different from a wavelength of the exited light.

(4) The particle sorting apparatus according to (3) above, in which
the calculating unit of the arrival time calculates the arrival time of each particle from the detection time difference between a scattered light derived from the excited light and the light derived from a scattered light for detecting a speed.

(5) The particle sorting apparatus according to any of (1) to (4) above, in which
the excited light irradiating unit includes two or more light sources emitting lights having different wavelengths.

(6) The particle sorting apparatus according to any of (1) to (5) above, in which
the sorting unit has a negative pressure suction unit being communicated with the flow path.

(7) The particle sorting apparatus according to (6) above, in which
the sorting control unit controls an operation of the negative pressure suction unit based on the data of the respective particles detected at the light detecting unit and the arrival time calculated at the calculating unit of an arrival time.

(8) The particle sorting apparatus according to any of (1) to (7) above, in which
the sorting control unit controls a timing to recover the particles by the sorting unit based on the data of the respective particles detected at the light detecting unit and the arrival time calculated at the calculating unit of an arrival time.

(9) A method of sorting particles, including:
irradiating an excited light to particles flowing through a flow path disposed within a microchip;
irradiating a light for detecting a speed to the particles at a position different from the excited light;
detecting a light emitted from the particles;
individually calculating an arrival time of each particle at a sorting unit disposed within the microchip and being communicating with the flow path from a detection time difference between the light derived from the excited light and the light derived from the light for detecting a speed; and
sort-controlling to determine whether or not the particles are recovered based on data of each particle detected by the light detection and the arrival time calculated by the arrival time calculation.

(10) The method of sorting particles according to (9) above, in which
the sorting control includes calculating an arrival time difference of former and latter particles, and determining that the particles are not recovered when the arrival time difference is under a threshold value.

(11) The method of sorting particles according to (9) or (10) above, in which
the light for detecting a speed having a wavelength different from a wavelength of the exited light is used.

(12) The method of sorting particles according to (11) above, in which
the calculation of the arrival time includes calculating the arrival time of each particle from the detection time difference between a scattered light derived from the excited light and a scattered light derived from the light for detecting a speed.

(13) The method of sorting particles according to any of (9) to (12) above, in which
the irradiation of an excited light emits different wavelengths from two or more light sources.

(14) The method of sorting particles according to any of (9) to (13) above, in which
the sorting unit has a negative pressure suction unit being communicated with the flow path, and
the sorting control includes controlling an operation of the negative pressure suction unit based on the data of the respective particles detected by the light detection and the arrival time calculated by the arrival time calculation.

(15) The method of sorting particles according to any of (9) to (14) above, in which
the sorting control includes controlling a timing to recover the particles by the sorting unit based on the data of the respective particles detected by the light detection and the arrival time calculated by the arrival time calculation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A flow cytometry system, comprising:
   a first detector of a first scatter channel to detect a first light scatter generated by a particle flowing in a flow channel of a fluid sample and passing through a first laser beam;
   a second detector of a second scatter channel to detect a second light scatter generated by the particle flowing in the flow channel of the fluid sample and passing through a second laser beam; and
   circuitry configured to
      output a first scatter pulse information and a first detection time of the first light scatter channel, a second scatter pulse information and a second detection time of the second light scatter channel,
      store the first detection time and the second detection time, and
      calculate a laser delay for the particle by calculating a time difference between the second detection time and the first detection time,
   wherein the first laser beam and the second laser beam are irradiated to the particle in different positions of the flow channel.

2. The flow cytometry system of claim 1, wherein
the first light scatter and the second light scatter are one of a forward scattered light, a side scattered light, a Rayleigh scattered light and a Mie scattered light.

3. The flow cytometry system of claim 1, wherein
the circuit is configured to associate an identifier with the detection time for each light scatter channel.

4. The flow cytometry system of claim 3, wherein
the identifier is channel information.

5. The flow cytometry system of claim 1, further comprising:
a first laser device to generate the first laser beam; and
a second laser device to generate the second laser beam.

6. The flow cytometry system of claim 1, wherein
the wavelength of the first laser beam is different from the wavelength of the second laser beam.

7. The flow cytometry system of claim 1, further comprising:
a flow path to receive a flow of the fluid sample and a flow of a sheath fluid, wherein the flow of the fluid sample is surrounded by the flow of the sheath fluid.

8. The flow cytometry system of claim 1, wherein
the first scatter pulse information includes at least one of a width, a height, and an area of the waveform of the first light scatter, and
the second scatter pulse information includes at least one of a width, a height, and an area of the waveform of the second light scatter.

9. The flow cytometry system of claim 1, wherein
the first detection time is calculated based on a time at a center of the waveform of the first light scatter, and
the second detection time is calculated based on a time at a center of the waveform of the second light scatter.

10. The flow cytometry system of claim 1 wherein
the circuitry is configured to determine a particle velocity of the particle based on the laser delay.

11. The flow cytometry system of claim 1 wherein
the circuitry is configured to generate a data packet for the particle, and
the data packet including the first scatter pulse information, the second scatter pulse information, and the laser delay.

12. The flow cytometry system of claim 11, wherein
the data packet further includes at least one of the first detection time, the second detection time, or the sorting time.

13. The flow cytometry system of claim 12, wherein
the data packet further includes at least one of an event number, trigger channel, trigger time, gate flag, or sort flag.

14. The flow cytometry system of claim 11, wherein
the circuitry is configured to output the data packet for the particle to a storage.

15. The flow cytometry system of claim 1, wherein
the circuitry is configured to calculate a sorting time based on the laser delay.

16. The flow cytometry system of claim 1, wherein
the first scatter pulse information includes at least one of a width, a height, an area of the waveform, an identifier, and a time of the first light scatter, and
the second scatter pulse information includes at least one of a width, a height, an area of the waveform, an identifier, and a time of the second light scatter.

17. The flow cytometry system of claim 16, wherein
the time of the first light scatter includes the first detection time, and
the time of the second light scatter includes the second detection time.

18. The flow cytometry system of claim 1, wherein
the first detection time is calculated based on a time at a maximum height of the waveform of the first light scatter, and
the second detection time is calculated based on a time at a maximum height of the waveform of the second light scatter.

19. The flow cytometry system of claim 1, further comprising:
a computer including a graphical user interface (GUI).

20. The flow cytometry system of claim 19, wherein
the GUI is configured to chart detected data.

21. The flow cytometry system of claim 20, wherein
the detected data includes a histogram chart or a 2D chart showing a maximum height or an area of at least one the waveform of the first light scatter and the waveform of the second light scatter.

22. A flow cytometry method comprising:

detecting, by a first detector of a first scatter channel, a first light scatter generated by a particle flowing in a flow channel of a fluid sample and passing through a first laser beam;

detecting, by a second detector of a second scatter channel, a second light scatter generated by the particle flowing in the flow channel of the fluid sample and passing through a second laser beam;

outputting a first scatter pulse information and a first detection time of the first light scatter channel, and a second scatter pulse information and a second detection time of the second light scatter channel;

storing the first detection time and the second detection time; and calculating a laser delay for the particle by calculating a time difference between the second detection time and the first detection time, wherein the first laser beam and the second laser beam are irradiated to the particle in different positions of the flow channel.

\* \* \* \* \*